United States Patent [19]

Resnicow

[11] Patent Number: 4,556,352
[45] Date of Patent: Dec. 3, 1985

[54] SHAFT-MOUNTED SNAP LOCK ASSEMBLY

[75] Inventor: Herbert Resnicow, East Williston, N.Y.

[73] Assignee: American Snap Nut Association, East Williston, N.Y.

[21] Appl. No.: 461,652

[22] Filed: Jan. 27, 1983

[51] Int. Cl.$^4$ .............................................. F16B 17/00
[52] U.S. Cl. ..................................... 411/433; 411/516
[58] Field of Search ............... 411/433, 516, 427, 437, 411/539; 24/136 R

[56]  References Cited

U.S. PATENT DOCUMENTS

| 370,168 | 9/1887 | Truxal | 411/433 X |
|---|---|---|---|
| 1,082,993 | 12/1913 | Beattie | 411/433 |
| 1,368,525 | 2/1921 | Parks | 411/539 |
| 1,405,342 | 1/1922 | Shaffer | 411/433 X |
| 1,721,100 | 7/1929 | Armstrong | 411/516 |
| 2,490,728 | 12/1949 | Cox | 411/277 |
| 2,719,025 | 9/1955 | Stone | 403/344 |
| 3,022,586 | 2/1962 | Towne | 411/516 X |
| 3,038,366 | 6/1962 | Hindman | 411/433 |
| 3,079,824 | 3/1963 | Schott | 411/516 X |
| 3,460,300 | 8/1969 | Howlett | 24/136 R |
| 3,734,547 | 5/1973 | Kojima | 411/437 |
| 3,799,026 | 3/1974 | Selch | 411/433 |
| 4,226,164 | 10/1980 | Carter | 411/433 |
| 4,274,323 | 6/1981 | Resnicow | 411/433 |

FOREIGN PATENT DOCUMENTS

| 898794 | 4/1972 | Canada | 411/433 |
|---|---|---|---|
| 1206230 | 8/1959 | France | 411/433 |

Primary Examiner—Kenneth J. Dorner
Assistant Examiner—Rodney M. Lindsey
Attorney, Agent, or Firm—John J. Byrne; Bradford E. Kile; Kevin M. O'Brien

[57]  ABSTRACT

Disclosed is a snap lock assembly which may be mounted on a shaft without passing over an end of the shaft. The assembly comprises two segments which are sized and shaped to encircle the shaft and which snap lock with each other. The shaft may be a rod, a bolt, or the like and; the assembly may be a nut, a washer, or the like.

17 Claims, 23 Drawing Figures

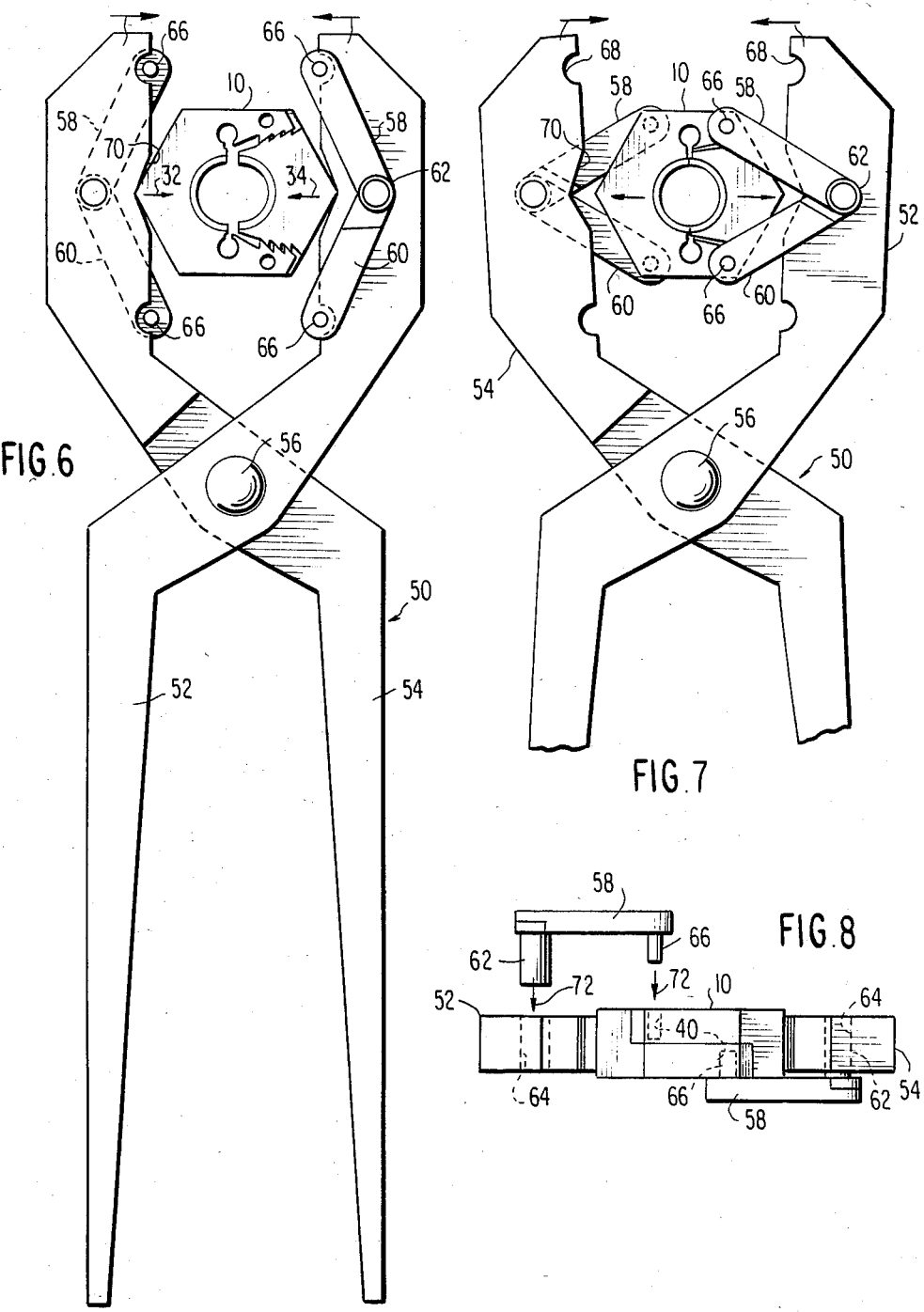

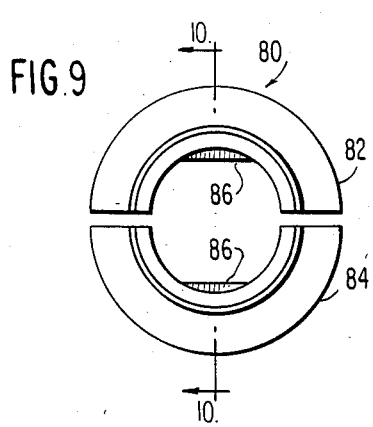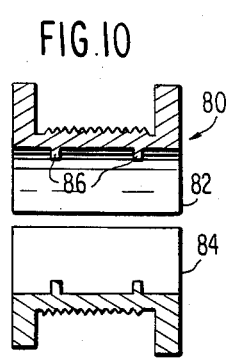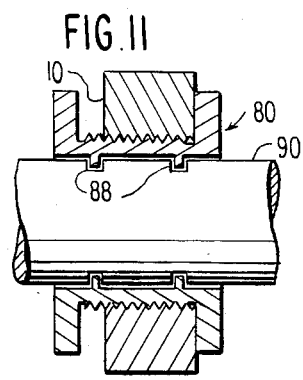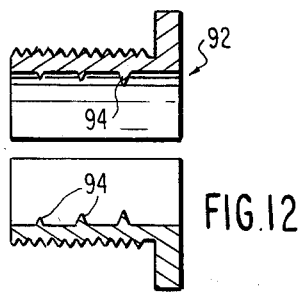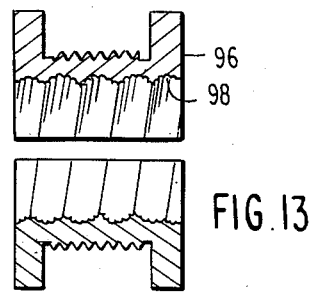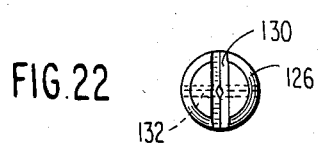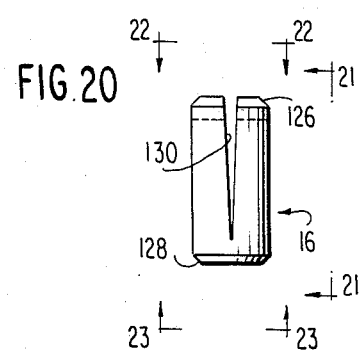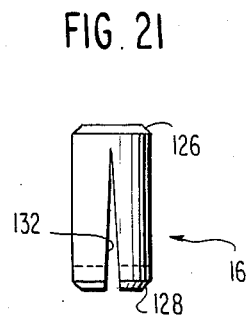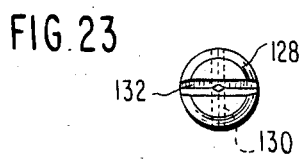

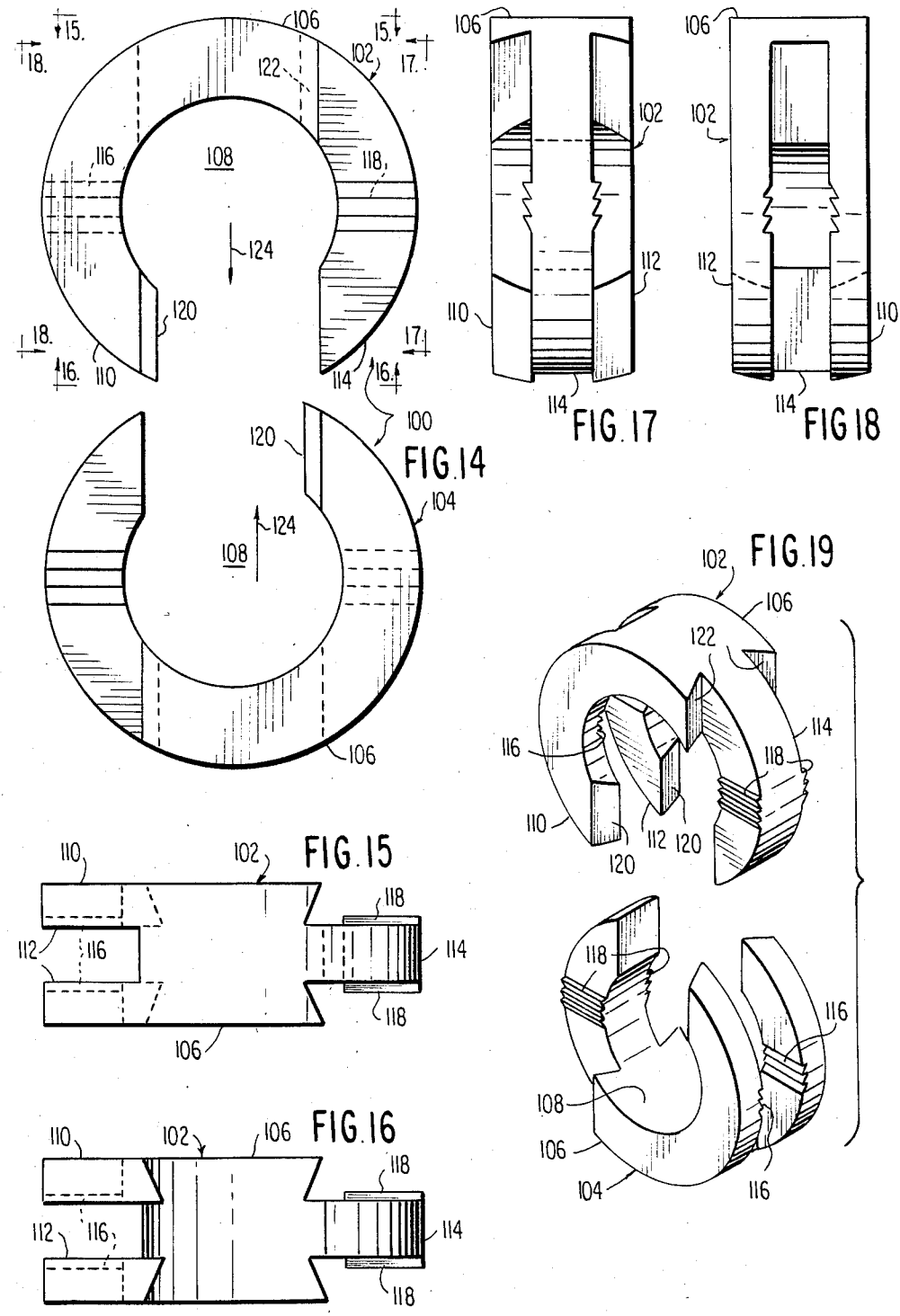

SHAFT-MOUNTED SNAP LOCK ASSEMBLY

RELATED PATENT

The instant invention relates to the subject matter of U.S. Pat. No. 4,274,323 entitled "Shaft-Mounted Assembly" of common inventorship herewith.

FIELD OF THE INVENTION

This invention relates to a snap lock assembly which is to be mounted on a shaft and a tool for applying the assembly. It may, for instance, relate to a nut for a threaded member such as a rod, a bolt, a sleeve, or the like. More particularly, this invention relates to an assembly which may be quickly applied to or released from a shaft and which may be placed in position on the shaft regardless of the accessibility of the ends of the shaft or the presence of intervening assemblies on the shaft.

BACKGROUND OF THE INVENTION

The purpose of this invention is to provide a snap lock assembly which can be quickly mounted on a shaft without passing over an end of the shaft and a tool for applying said assembly.

In conventional nut and bolt assemblies, the nut is passed over the free end of the bolt and threaded into position to secure a member between the head of the bolt and the nut. This, of course, requires access to the free end of the bolt, and it may also require the expenditure of a substantial amount of time to thread the nut into position.

In the past others have sought ways to expedite the assembly of nuts onto threaded members. In the assembly disclosed in U.S. Pat. No. 1,406,804, issued Feb. 14, 1922, to W. S. Alexander and entitled "Quick Releasable Nut and Bolt," an internally threaded nut is split into two segments which may be placed in mating relationship with external threads on a bolt at any point intermediate the length of the bolt. The nut segments are held in position by means of a unitary retaining member which has wedge-shaped surfaces which engage and interact with wedge surfaces on the nut segments so that, when the bolt is tightened, the retaining member is forced into surrounding engagement with the nut segment to maintain the nut in place. In that device, however, the mating member is unitary and must be slid over the free end of the bolt. Therefore, the assembly is not usable with a threaded member when there is no accessible free end.

A significant advance was realized in the art by the disclosure of the above-identified U.S. Pat. No. 4,274,323. In this connection several embodiments are disclosed of an assembly which may be facilely mounted about a shaft without requiring access to the ends of the shaft. Most of the embodiments disclosed in U.S. Pat. No. 4,274,323, however, comprise four components. Accordingly, such shaft-mounted assemblies may be somewhat complicated to manufacture and assemble for certain purposes. Further, although some embodiments are composed of only two segments, such assemblies are not positively retained in an assembled condition, which can be a disadvantage in some applications.

The difficulties suggested in the preceding with regard to prior shaft-mounted assemblies are not intended to be exhaustive, but rather are among many which may tend to limit the effectiveness and satisfaction with prior units. Other noteworthy problems may also exist; however, those presented above should be sufficient to demonstrate that prior lateral shaft-mounted assemblies will admit to worthwhile improvement.

OBJECTS OF THE INVENTION

It is, therefore the general objective of the invention to provide an assembly which will obviate or minimize difficulties of the type previously described.

It is a specific object of this invention to provide a novel shaft-mounted assembly which consists of only two components.

It is another object of this invention to provide a novel shaft-mounted assembly in which the components are positively retained in an assembled condition.

It is a further object of the invention to provide a novel shaft-mounted assembly composed of two identical components which may be laterally interlocked about a threaded shaft or the like.

It is yet a further object of the invention to provide a novel tool for assembling and disassembling components of the instant invention.

SUMMARY OF THE INVENTION

This invention provides an assembly which may be radially mounted about a shaft without passing over an end of the shaft. The assembly comprises two segments which are sized and shaped to encircle the shaft and which snap interlock with one another. In a preferred embodiment, each segment is identical, including internal threading and may be manufactured as interchangeable parts.

The invention further comprises a tool to facilely lock and unlock the snap action segments radially about a shaft using pushing actions of opposing parts for both operations.

BRIEF DESCRIPTION OF THE DRAWINGS

FIG. 6 is a plan view of a special tool in accordance with the invention, which is used to assemble and disassemble the first embodiment of the invention, showing the first embodiment being assembled;

FIG. 7 is a fragmentary plan view of the special tool showing the first embodiment being disassembled;

FIG. 8 is a fragmentary side view of portions of the special tool and the first embodiment of the invention illustrating how disassembly of the first embodiment is accomplished;

FIG. 9 is a plan view showing a two-part adapter such that the first embodiment of the invention can be used with a shaft which is not threaded;

FIG. 10 is a view along section line 10—10 in FIG. 9;

FIG. 11 is a view similar to FIG. 10 but showing a smooth shaft received in the two-part adapter and the first embodiment of the invention mounted over the two-part adaptor assembly;

FIG. 12 is a view similar to FIG. 10 of a second embodiment of the two-part adaptor assembly;

FIG. 13 is a view similar to FIG. 10 of a third embodiment of the two-part adaptor assembly suitable for use with a wire rope or the like;

FIG. 14 is a plan view of a second embodiment of the invention disclosing two components in an unassembled condition;

FIG. 15 is a side view in the direction of line 15—15 in FIG. 14;

FIG. 16 is a side view in the direction of line 16—16 in FIG. 14;

FIG. 17 is a side view in the direction of line 17—17 in FIG. 14;

FIG. 18 is a side view in the direction of line 18—18 in FIG. 14;

FIG. 19 is an exploded perspective view of the second embodiment of the invention showing the two components in an unassembled condition;

FIG. 20 is a side view of an optional retaining rod previously shown in FIG. 1;

FIG. 21 is a view along line 21—21 in FIG. 20;

FIG. 22 is a view along line 22—22 in FIG. 20; and

FIG. 23 is a view along line 23—23 in FIG. 20.

DETAILED DESCRIPTION OF PRESENTLY PREFERRED EMBODIMENTS OF THE INVENTION

Figure 1:
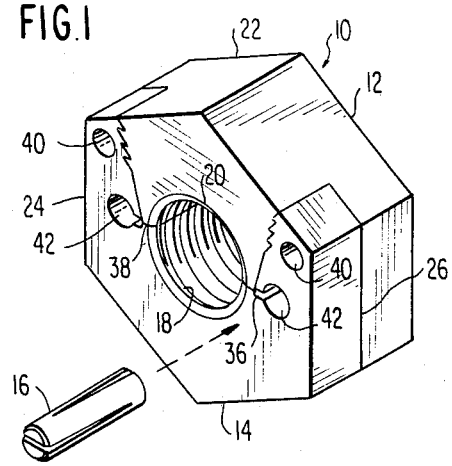
FIG. 1 is a perspective view of a first embodiment of the invention in an assembled condition.

A snap lock assembly 10 is shown in FIGS. 1-5 which essentially comprises two segments, 12 and 14. (A third component, a retaining rod 16, to be described later, is optional). A particular advantage of the invention is that the segments 12 and 14 may be (and preferably are) identical, which facilitates both manufacture and assembly. Threads 18 extend about the inner profile of the segments 12 and 14 and may be formed before use or they may be formed in place, as by turning the assembly 10 on a threading tool.

The segments 12 and 14 are sized and shaped to encircle a threaded shaft (not shown). The assembly 10 may, for instance, serve as a nut, and in that case the circumferential surface of the assembly 10 is preferably polygonal in shape (as shown) to facilitate turning of the assembly 10 on the shaft.

In any event, the segments 12 and 14 are designed to radially snap interlock with each other in an assembled condition. In this regard, each segment 12 and 14 includes a body portion or member 22 having an arc portion which defines part or an arc portion of an inner bore 20 and two circumferentially spaced and mutually facing projections or tongues 24 and 26 which axially extend preferrably one-half of the length of the body 22. Each projection 24 and 26 has teeth 28, which are preferably ratchet shaped, on an inwardly locking face, and each portion 22 has first and second circumferentially spaced shoulder portions with corresponding teeth 30 on outwardly looking faces or circumferentially spaced shoulder portions. The outwardly looking faces slope generally linearly away from an imaginary plane intersecting an imaginary longitudinal axis of said arc portion. Said imaginary plane serving to divide the body member 22 into identical portions on each side of the imaginary plane. The ratchet shaped teeth 28 and 30 each comprise generally planar ramp portions and a recess at the end of each ramp and at the beginning of a next adjacent tooth and the teeth are are sized, shaped, and positioned to be mutually opposing and interengage by a snap fit relatively easily, but cannot be pulled apart without a special tool, to be described below, thereby mutually interlocking the segments.

Figure 2:
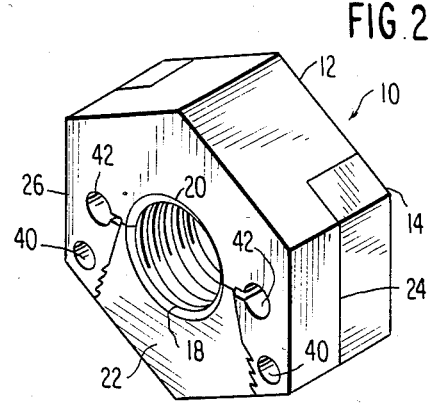
FIG. 2 is a perspective view of the first embodiment of the invention in an assembled condition, showing the opposite side from FIG. 1.
Figure 3:
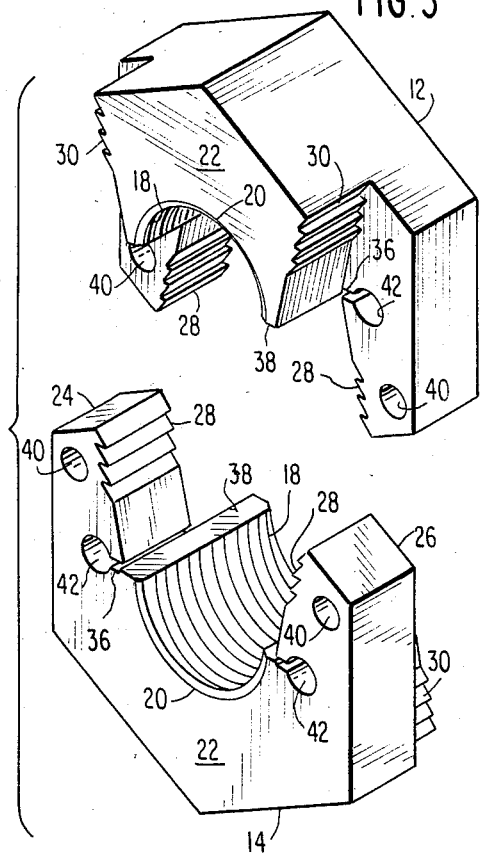
FIG. 3 is an exploded perspective view of the two components of the first embodiment of the invention in an unassembled condition.
Figure 4:
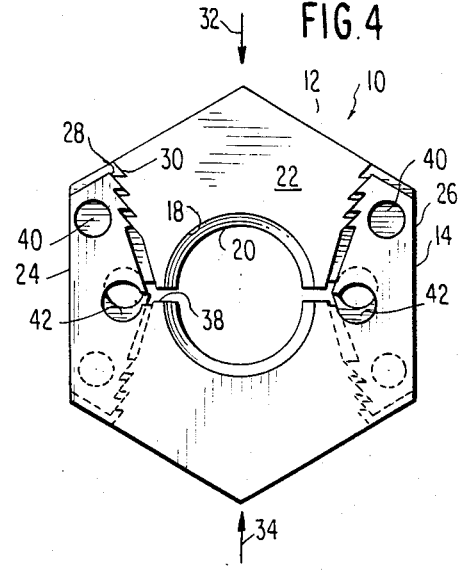
FIG. 4 is a plan view of the components of the first embodiment of the invention being assembled, showing the components in a posture ready to be snapped into an assembled condition.
Figure 5:
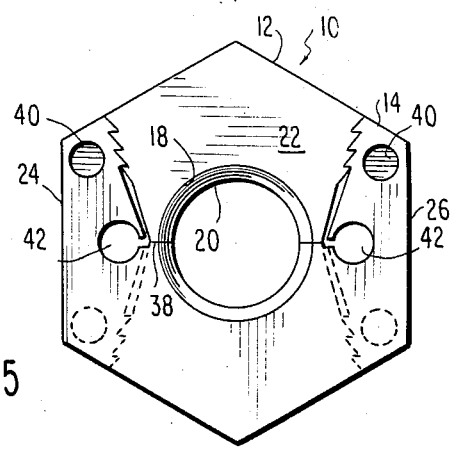
FIG. 5 is a plan view of the first embodiment of the invention in an assembled condition.

Further in the above connection, the assembly 10 is assembled by placing the two segments 12 and 14 against each other as shown in FIG. 4, then imposing diametrically opposite forces on the segments 12 and 14 as indicated by the arrows 32 and 34. These forces cause the projection 24 and 26 to deflect slightly outwardly and the teeth 28 to ride up over the teeth 30 in ratchet fashion until the two segments are held in tightly interlocked fashion, as shown in FIGS. 1, 2, and 5. The amount of force required to effect the necessary outward deflection obviously depends greatly on the dimensions of the projections 24 and 26, the axial length of the assembly, the size and shape of the teeth 28 and 30, and the material from which the segments 12 and 14 are fabricated. However, only very slight angular distortion is required, and in practice it has been found entirely practical to manually assemble elements 12 and 14 fabricated from steel using a special tool shown in FIG. 6-8 and described hereinafter, or in some cases, even hand pressure.

To facilitate outward flexure of the segments 12 and 14 during assembly and disassembly, an inwardly opening relief 36 is preferably provided between each body 22 and each of the projections or tongues 24 and 26. However, a planar axial surface 38 is preferably provided on each body 22 adjacent each relief 36 and radially inwardly of the adjacent tongue 24 or 26 in position to abut against a corresponding planar axial surface 38 on a corresponding body portion 22 when the segments 12 and 14 are in an assembled condition.

Preferably, the body portions 22 and the projections 24 and 26 of each member all have coplanar outer radial surfaces so that, as shown in FIGS. 1 and 2, the snap lock assembly 10 has a planar, continuous end surface on both axial sides to form regular polygonal shaped wrench flats.

Each projection 24 and 26 preferably is manufactured with an axially extending opening 40 (preferably in the form of a through bore) for use in disassembly. The functioning of this opening will be explained hereinafter in connection with the description of a special tool shown in FIGS. 6-8.

One or more of the axially extending openings 42 may be provided in the segments 12 and 14 in position to be axially aligned with a corresponding opening 42 in the other segment 12 or 14. (The openings 42 are preferably communicating with and forming a part of the reliefs 36 in order to provide an optional or additional flexibility or relief, but that is not essential.) The openings 42 are sized and shaped to receive retaining rods 16, which may be press fit into the openings 42. In practice it has been found that the rods 16 are not required in most situations. In any event, if the rods 16 are used, the rods 16 may be easily tapped through the openings 42 prior to disassembly of the segments.

Finally, in the foregoing description the bore 20 is fashioned with threads 18. The threads intimately engage corresponding threads on a shaft and prevent relative axial travel of one of the segments with respect to the other. In a preferred embodiment the threads, body, and projections of each segment are identical and thus interchangeable and facilely manufactured in bulk lots and sold as a set.

The Special Tool

A special tool 50, shown in FIGS. 6–8, is used to assemble and disassemble the shaft-mounted assembly shown in FIG. 1–5.

The tool 50 consists of two major arms 52 and 54 pivoted together at 56 and two pairs of minor arms 58 and 60. Each pair of minor arms 58 and 60 is pivotably mounted on a stub shaft 62 which is rotatably received in a corresponding bore 64 in a working portion of the major arms 52 and 54. Each minor arm 58 or 56 carries a pin 66 which is sized, shaped, and positioned to be received within openings 40 in a snap assembly segment 12 or 14.

In order to assemble the snap unit 10, the segments 12 and 14 are operably grasped between the working portions of the major arms 52 and 54 and forced together, as previously explained with reference to FIG. 4. In this mode, the minor arms 58 and 60 are held in inoperative position by recesses 68 in the major arms 52 and 54. The recesses 68 function as detent means, releasably holding the minor arms 58 and 60 out of the way.

A notch 70 is preferably provided in the working surfaces of the major arms 52 and 54, sized, shaped, and positioned to receive and position the segments 12 and 14 correctly for assembly.

The minor arms 58 and 60 and the stub shaft 62 are preferably provided as an assembly, and that assembly is preferably movable axially relative to the major arms 52 and 54, as indicated by the arrows 72 in FIG. 8. However, only one minor arm need be able to move axially; the other may be fixed. If the bottom one (with the tool held horizontally to place an assembly on a vertical threaded rod) is fixed, it will not fall out or away in use. The top pair of arms can slide axially.

The axial mobility of the minor arms 58 and 60 permits them to be moved into the position shown in FIG. 8, in which position the assembly 10 is located between the working portions of the major arms 52 and 54, after which the stub shafts 62 are inserted into the corresponding bores 64 in the major arms 52 and 54 and the pins 66 are inserted into the corresponding openings 40 in the tongues 24 and 26. When so inserted, inward motion of the working portions of the major arms 52 and 54 causes the minor arms 58 and 60 in each pair to pivot apart. Outward pivotal movement of the minor arms 58 and 60 in turn causes the projections or tongues 24 and 26 to flex outwardly, releasing the engagement of the teeth 28 with the teeth 30. Concomitantly, inward movement of the jaws 52 and 54 produces relative outward pushing action between segments 12 and 14 as indicated by directional arrows in FIG. 7. Once the teeth 28 clear teeth 30, the segments 12 and 14 pop out of engagement, and the assembly 10 is disassembled.

It should be particularly noted that the normal (closing) movement of the jaws of the tool, in addition to closing the snapnut by pushing action, separates and pushes the segments of the assembly apart.

Illustrative Uses of the First Embodiment

FIGS. 9–11 illustrate use of the assembly 10 in association with a smooth shaft. In this connection, FIGS. 9 and 10 show a two-part bearing sleeve 80 consisting of threaded segments 82 and 84. The segments 82 and 84 have internal splines 86 which are rectangular in cross-section and which, as shown in FIG. 11, are received in corresponding rectangular slots 88 in a smooth shaft 90. Thus, the segments 82 and 84 may be placed in position around the shaft 90 and then held in position with the assembly 10. The segments 82 and 84 are shown with end flanges. Alternatively a pair of snap assemblies 10 may be used and turned into each other to form a locked unit without use of flanges.

FIG. 12 illustrates a second, two-part adapter sleeve 92 which is similar to the sleeve 80 except that internal prongs or points 94 are fashioned to be triangular in cross-section rather than rectangular and serve to wedge themselves into a smooth shaft and eliminate any necessity for prior grooving of the smooth exterior of a shaft. Note that the tips lie along a sloped line so that, as the snapnut assembly 10 is screwed onto the end of the sleeve, it gradually forces the points, one by one, to penetrate the shaft material so as to axially secure the adaptor with respect to the smooth shaft.

FIG. 13 illustrates another two-part adapter clamp 96 which is similar to the adapter sleeves 80 and 92 except that the inner bore 98 is shaped to receive and clamp a coiled rope or wire cable.

The Second Embodiment

A second preferred embodiment of the invention is disclosed in FIG. 14–19. In this connection, self-interlocking, snap action assembly 100 is shown which essentially comprises two segments, 102 and 104. The segments 102 and 104 are preferably identical, which facilitates both manufacture and assembly. The assemblies are sized and shaped to encircle a shaft (not shown). The snap action assembly 100 may, for instance, serve as a washer, and in that case the circumferential surface of the assembly is preferably cylindrical in shape (as shown).

The segments 102 and 104 are designed to interlock with each other in their assembled condition. In this regard, each segment 102 and 104 comprises a body 106 which defines a part of a bore 108 for the reception of a shaft, two axially spaced projections or tongues 110 and 112 which project from the body 106 in a first angular sense (i.e., either clockwise or counterclockwise, depending on which side of the segment is observed, and a third, axially intermediate tongue 114 which projects from the body 106 in the opposite, angular sense (i.e., either counterclockwise or clockwise). The third projection or tongue 114 is sized and shaped to be received between and to axially interface with the axially spaced tongues 110 and 112 on the other one of the segments 102 and 104, and the six projections or tongues (three on each segment) together define, in cooperation with the body portions, a cylindrical bore 108. When this member is used as a washer it will be appreciated that the bore 108 will be sized somewhat larger than the shaft intended to receive the washer. Alternatively, if the snap action unit depicted in FIGS. 14–19 is used as a tightfitting washer, wheel, gear, pully, etc., the bore 108 will be selected to securely surround and grip an associated shaft.

Axially inwardly projecting teeth 116 are provided on each of the axially spaced tongues 110 and 112, and axially outwardly projecting teeth 118 are provided on each axial surface of the third intermediate tongue 114. The teeth 116 on each segment are sized, shaped, and positioned to engage the teeth 118 on a corresponding segment, thereby interlocking the segments 102 and 104.

Each tongue 110, and 112, ends in a planar abutment surface 120. Preferably (and as shown) the planar abutment surfaces 120 and 122 lie in planes which are not parallel to the axis of the bore 108.

To assemble the assembly 100, the two segments 102 and 104 are snapped together as indicated by the arrows 124 in FIG. 14. Diametrically opposite forces on the segments 102 and 104 cause the tongues 110, 112, and 114 to flex outwardly, permitting the teeth 116 and 118 to ride over one another in ratchet fashion until the two segments are held in tightly interlocked engagement. The amount of force required to effect the necessary flexure of the segments 102 and 104 depends on the size and shape of the tongues 110, 112, and 114; the size, number, depth, angle, and shape of the teeth 116 and 118; the material from which the segments 102 and 104 are fabricated; and the axial length of the assembly. However, only very slight angular distortion is normally required, and in practice it has been found entirely practical to manually assemble units fabricated form steel. Such assembly can be accomplished using the special tool 50 shown in FIG. 8.

Retaining Rod

One embodiment of the previously discussed retaining rod 16 is shown in more detail in FIG. 20 through 23. As depicted therein, the rod 16 is basically cylindrical in shape, but is chamfered at 126 and 128. Additionally, a V-shaped axial slot 130 is formed in one end surface, and a second V-shaped axial slot 132 is formed in the other end surface perpendicularly oriented with respect to the slot 130. The two axial slots are deep enough to intersect each other, providing considerable radial flexibility during assembly and disassembly—that is, as the rods 16 are forced into or out of the openings 42.

Although the above discloses one embodiment of pin 16, other forms of the pin are envisioned such as a pin having two or more sets of slots or slits in each end. Moreover, the pin 16 may be a cylinder with one or more axially extending, wedge shaped sections. Still further, the pin 16 may assume the shape of a cylindrical sinusoidal wire spring.

I claim:

1. A snap lock assembly operable to be radially mounted about a shaft without passing over an end of a shaft or sliding axially along a shaft, said assembly comprising first and second segments which are sized and shaped to encircle a shaft and which radially interlock with each other, each of said first and second segments comprising:
a body member having an arc portion defining part of a bore for the reception of at least a part of a shaft and having engaging means on the inner periphery of said part of a bore for at least partially engaging a member placed within the bore;
first and second circumferentially spaced shoulder portions, integral with said body member, and having longitudinally extending outwardly directed faces, which slope generally linearly away from an imaginary plane intersecting an imaginary longitudinal axis of said arc portion, said imaginary plane further serving to divide said body member into identical portions on each side of said imaginary plane;
a plurality of rachet teeth formed upon each of said sloping faces of said first and second shoulder portions, said rachet teeth each including generally planar ramp portions and a recess at the end of each ramp and at the beginning of a next adjacent tooth;
first and second circumferentially spaced projections integral with and extending outwardly from said body member, said spaced projections having longitudinally extending, mutually opposing faces extending on opposite sides of the imaginary plane which slope generally linearly away from the imaginary plane; and
a plurality of rachet teeth extending from each of said mutually opposing faces of said first and second circumferentially spaced projections said rachet teeth each including generally planar ramp portions and a recess at the end of each ramp and the beginning of a next adjacent tooth wherein said rachet teeth of said first and second circumferentially spaced projections of said first segment operably engage with said rachet teeth of the faces of said first and second shoulder portions respectively of said second segment and said rachet teeth of said first and second circumferentially spaced projections of said second segment concomitantly engage with said rachet teeth of the faces of said first and second shoulder portions respectively of said first segment when said first and second segments may be radially snapped together to operably form a unified snap lock assembly about a shaft without passing over an end of the shaft or sliding axially along the shaft.

2. A snap lock assembly as defined in clam 1 wherein:
an inwardly opening relief is provided between said body member and each of said first and second projections to facilitate outward flexure of said first and second projections during assembly.

3. A snap lock assembly as defined in claim 1 wherein:
said engaging means on the inner periphery of said part of said bore comprises screw threads.

4. A snap lock assembly as defined in claim 3 and further comprising:
an adaptor means comprising,
a cylindrical member axially divided into first and second opposing halves and being threaded on an exterior surface thereto to match the screw threads of said engaging means of said first and second segments and means internal to said cylindrical member for operably engaging a generally cylindrical shaft.

5. A snap lock assembly as defined in claim 4 wherein said means internal to said cylindrical member comprises:
at least one transverse spline for engaging a recess in the shaft.

6. A snap lock assembly as defined in claim 4 wherein said means internal to said cylindrical member comprises:
a plurality of axially spaced transversely extending teeth which increase in depth from one end of said cylindrical member to the other for grippingly engaging an external surface of the shaft.

7. A snap lock assembly as defined in claim 4 wherein said means internal to said cylindrical member comprises:
a braided surface operable to securely engage an external surface of a braided rope.

8. A snap lock assembly as defined in claim 1, 3 or 4 wherein:
said first and second segments are identical.

9. A snap lock assembly as defined in claim 1 wherein:

said body members have axially extending surfaces which abut each other in an assembled condition and said first and second projections are located radially outwardly of said axially extending surfaces.

10. A snap lock assembly as defined in claim 1 wherein:

said first and second segments have planar outer radial surfaces which operably form wrench flats on an outer surface of said snap lock assembly.

11. A snap lock assembly as defined in claim 1 wherein:

each of said first and second circumferentially spaced projections contains an axially extending opening in a position adjacent an outer limit thereof for use in disassembly of said snap lock assembly.

12. A snap lock assembly as defined in claim 10 wherein:

said outer surface of said snap lock assembly is polygonal in configuration.

13. A snap lock assembly as defined in claim 1 wherein:

each of said first and second segments contains at least one axially extending opening through at least one of said first and second circumferentially spaced projections in position to axially align with a corresponding axially extending opening in the other of said first and second segments when said segments are assembled into a snap lock and further comprising;

at least one retaining member sized and shaped to be fit into the axially aligned openings.

14. A snap lock assembly as defined in claim 13 wherein:

said at least one retaining member is cylindrical in shape and having a first end and a second end;

at least a first axial slot is formed in one of said first and second ends; and at least a second axial slot is formed in the other of said first and second ends.

15. A snap lock assembly as defined in claim 14 wherein:

said axial slots are mutually perpendicular and axially extend substantially to the other end of said cylindrical retaining member.

16. A snap lock assembly as defined in claim 14 wherein:

said axial slots are V-shaped.

17. A snap lock assembly as defined in claim 14 wherein:

said rod is chamfered at least at one end thereof.

* * * * *